United States Patent [19]

Nagano

[11] Patent Number: 4,557,286
[45] Date of Patent: Dec. 10, 1985

[54] BALL VALVE WITH EMERGENCY SEALING DEVICE

[75] Inventor: Tsutomu Nagano, Kitakoma, Japan

[73] Assignee: Kitz Corporation, Tokyo, Japan

[21] Appl. No.: 559,291

[22] Filed: Dec. 5, 1983

[30] Foreign Application Priority Data

Dec. 22, 1982 [JP] Japan .................. 57-193060[U]

[51] Int. Cl.⁴ ............................................. F16K 13/04
[52] U.S. Cl. ..................................... 137/74; 137/72;
251/174; 251/317; 251/360
[58] Field of Search ...................... 137/72, 74, 75;
251/174, 317, 360

[56] References Cited

U.S. PATENT DOCUMENTS

| 3,346,234 | 10/1967 | Allen | 251/174 |
| 4,071,041 | 1/1978 | Moran | 251/360 X |
| 4,280,522 | 7/1981 | Pechuyo | 251/174 X |
| 4,318,420 | 3/1982 | Calvert | 251/174 X |

Primary Examiner—Harold W. Weakley
Attorney, Agent, or Firm—Wenderoth, Lind & Ponack

[57] ABSTRACT

A ball valve with an emergency sealing device has a ball having a through hole rotatably mounted within a valve body; ball seat retainers are positioned between the valve body and the ball; ball seats, made of a heat destructible material are mounted on the ball seat retainers and brought into sealing contact with the ball surface, one each to the ball seat retainers; first sealing rings, made of a heat destructible material for functioning under normal conditions are mounted one each on portions of the ball seat retainers where they contact the valve body; annular projection surfaces are provided on each ball seat retainer on parts of the outer circumferences of the ball seat retainers; second sealing rings, made of a heat resistant, flexible material for functioning in case of emergency, are mounted one each on portions of the annular projection surfaces of the ball seat retainers where they contact the inner circumference of the valve body and have pressing mechanisms engaging them, the diameter of the second sealing rings being larger than that of the first sealing rings.

9 Claims, 10 Drawing Figures

BALL VALVE WITH EMERGENCY SEALING DEVICE

BACKGROUND OF THE INVENTION

1. Field of the Invention

The present invention relates to a ball valve of a trunnion mounting type etc. having retainers for ball seats and, more particularly, to a ball valve with an emergency sealing device which functions, in case of emergency such as when subjected to high temperatures due to a fire etc., to urgently seal off the portions of contact between the inner circumference of a valve body and the outer circumferences of retainers for ball seats with accuracy and also to accurately effect metal-to-metal sealing between the ball seat retainers and a ball.

2. Description of the Prior Art

A ball valve having ball seat retainers is generally provided with heat destructible, elastic seal members which are disposed one each between a ball and ball seat retainers and between the ball seat retainers and a valve body, thereby preventing a fluid from leaking out. However, when the ball valve is heated to high temperatures due to a possible accident such as a fire etc., the heat destructible seal members are burnt down or fused and lose their function. This brings about a possibility of a fluid leaking out of the valved pipes to thereby cause the fire to spread rapidly or cause the ball valve to fail to fulfill its operational function.

In order to avoid the aforementioned adverse phenomena, a conventional ball valve with an emergency sealing device comprises, as illustrated in FIG. 1, a ball 1, a ball seat 9, a ball seat retainer 2 having a metal-contact portion 3 formed on the leading end thereof on the ball 1 side, a retainer gland 8 disposed behind the ball seat retainer 2, a heat destructible spacer 6 interposed between the ball seat retainer 2 and the retainer gland 8, an O ring 10 for sealing off the space between the ball seat retainer 2 and a valve body 4, a coiled spring 7 accommodated in a hole 4' formed in the valve body 4 (or a body cap) and adapted to bias the retainer gland 8 toward the ball 1 side, and heat resistant flexible sealing ring 5 interposed between the outer circumference of the ball seat retainer 2 and the inner circumference of the valve body 4. In another prior art ball valve with an emergency sealing device as shown in FIGS. 2(A) and 2(B), a coiled spring 7 is retained by a spring holder 8' instead of providing a hole for the accommodation of the coiled spring 7.

When seal members, i.e. the ball seat 9 and O ring 10, and the spacer 6 in the state shown in FIG. 1 or FIG. 2(A) are burnt down or fused, in case of emergency, either a piston action of the ball seat retainer 2 resulting from the difference between fluid pressures exerted on the front and rear annular end surface of the ball seat retainer 2 which have a thickness A corresponding to the difference in radius between a circle defined by a line of contact between the ball seat retainer 2 and the valve body 4 and a circle defined by a line of contact between the ball seat retainer 2 and the ball 1 as illustrated in FIG. 2(B) or the force of the coiled spring 7, or both, brings the metal-contact portion 3 of the ball seat retainer 2 into contact with the surface of the ball 1 and, at the same time, causes the sealing ring 5 to be pushed toward the ball 1 side through the retainer gland 8 to fulfill its sealing function in cooperation with the force of the coiled spring 7, as shown in FIG. 2(B).

In the prior art ball valves described above, the piston action resulting from the aforementioned difference in fluid pressure exerted on the ball seat retainer 2 is larger than the piston action before the ball seat 9 is burnt down or fused as illustrated in FIG. 1 or FIG. 2(A), i.e. the piston action of the ball seat retainer 2 resulting from the difference between the fluid pressures exerted on the front and rear annular end surfaces of the ball seat retainer 2 which have a thickness A' corresponding to the difference in radius between a circle defined by a line of contact between the ball seat retainer 2 and the valve body 4 and a circle defined by a line of contact between the ball seat 9 and the ball 1. However, since the frictional resistance of the sealing ring 5 relative to the valve body 4 in the state assumed after the spacer 6 has been burnt down or fused is larger than that of the O ring 10 before the spacer 6 is burnt down or fused, the force for urging the ball seat retainer 2 toward the ball 1 becomes insufficient and often causes incomplete contact between the metal-contact portion 3 of the ball seat retainer 2 and the ball 1. For this reason, a ball valve with an emergency sealing device is required to sufficiently increase the piston action of the ball seat retainer 2 resulting from the difference between the fluid pressures exerted on the front and rear annular end surfaces of the ball seat retainer 2 which have the aforementioned thickness A.

The conventional ball valve shown in FIG. 1 requires a boring process for forming a number of holes in the valve body 4 for accommodating therein coiled springs 7, which is troublesome work necessitating much time and labor. Although the conventional ball valve shown in FIG. 2(A) does not require such a boring process relative to the valve body 4, it requires preparatory formation of the spring holders 8' as separate component parts which increases the number of the component parts required by the number of the spring holders 8' to be prepared and also necessitates attachment of the spring holders 8' to the inside of the valve body 4 for accommodating therein the springs 7 which makes the work of assemblage complicated.

SUMMARY OF THE INVENTION

In view of the state of affairs described above, the present invention has been accomplished to develop a ball valve with an emergency sealing device fully satisfying its necessary conditions.

One object of the present invention is to provide a ball valve with an emergency sealing device, which makes large as possible the area of the end surface of a ball seat retainer to which fluid pressure is applied to thereby enable the piston action of the ball seat retainer to be utilized to the fullest extent.

Another object of the present invention is to provide a ball valve with an emergency sealing device, which is capable of keeping the increase in the number of the component parts to a minimum and simplifying the work of assemblage by forming a retainer gland with an integral construction which can press a sealing ring and serve as a retainer for a spring.

To attain the objects described above, according to the present invention, there is provided a ball valve with an emergency sealing device, which comprises a ball provided with a through hole at the center thereof and rotatably disposed within a valve body, ball seat retainers interposed between the valve body and the ball and each provided on part of the outer circumference thereof integrally with an annular projection surface, ball seats made of a heat destructible elastic material, attached one each to the ball seat retainers and adapted to be brought into sealing contact with the surface of the ball, first sealing rings made of a heat destructible elastic material and attached to portions of contact between the outer circumferences of the ball seat retainers and the inner circumference of the body to fulfill their sealing function under normal conditions, second sealing rings made of a heat resistant, flexible material and attached to portions of contact between the annular projection surfaces of the ball seat retainers and the inner circumference of the body to fulfill their sealing function only in case of emergency, and pressing mechanisms disposed between the inner surface of the valve body and the outer surfaces of the ball seat retainers and adapted to urge the ball seat retainers toward the ball under normal conditions and to press the ball seat retainers and compress the second flexible sealing rings toward the ball in case of emergency, the second sealing rings having a larger diameter than the first sealing rings, the ball seat retainers each having a metal-contact portion to be brought into sealing contact with the surface of the ball only in case of emergency, and said metal-contact portion having a diameter smaller than that of the ball seats.

The aforementioned and other objects, characteristic features and advantages of the present invention will become apparent from the following description given with reference to the accompanying drawings.

DESCRIPTION OF THE PREFERRED EMBODIMENTS

The present invention will now be described in detail with reference to the embodiments shown in FIG. 3-7.

Figure 6:
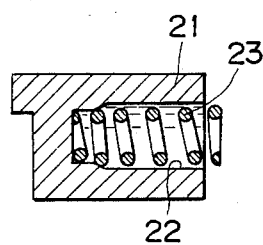
FIG. 6 is an enlarged cross section showing the state wherein a spring is attached to the retaining portion of a retainer gland usable in the present invention.

FIGS. 3, 4(A) 4(B), 6 and 7 illustrate one embodiment of the ball valve with an emergency sealing device according to the present invention. In this embodiment, reference numeral 11 denotes a body of a ball valve which has a ball 14 having a through hole 13 and attached rotatably to body 11 by trunnions 12. Annular ball seat retainers 15 are provided on the opposite sides of the ball 14. Each of the ball seat retainers 15 has on the ball 14 side a metal-contact portion 16 to be brought into a sealing contact with the surface 14a of the ball 14 only in case of emergency and has an annular ball seat 17 attached thereto on the ball 14 side. The annular ball seats 17 attached to the ball seat retainers 15 are made of an elastic and heat destructible material such as trifluoroethylene resin, tetrafluoroethylene resin, nylon, rubber, etc., and brought into intimate contact with the ball surface 14a on the primary and secondary sides respectively to carry out sealing action. First heat destructible sealing rings 18 are attached one each to the portions of contact between the outer circumferences of the ball seat retainers 15 and the inner circumference of the valve body 11. In this embodiment, O rings made of rubber etc. are adopted as the first sealing rings 18. The O rings are adapted to seal off the portions of contact between the ball seat retainers 15 and the valve body 11 under normal conditions of the ball valve. Each of the ball seat retainers 15 has an annular projection surface 19 formed integrally with part of the outer circumference thereof. To the portions of contact between the inner circumference of the valve body 11 and the annular projection surfaces 19 are attached one each second heat resistant flexible sealing rings 20 which are made of flexible graphite etc. These second sealing rings 20, in case of emergency, are pressed by pressing mechanisms to be deformed to seal off the spaces between the outer circumferences of the ball seat retainers 15 and the inner circumference of the valve body 11. Each of the pressing mechanisms comprises an annular retainer gland 21 which has a number of spring retaining portions 22 formed integrally therewith on the side opposite the ball surface 14a side, as shown in FIG. 6, a number of coiled springs 23 each having its one end brought into contact with the inner surface of the valve body 11 and its other end brought into contact with the spring retaining portion 22 of the retainer gland 21, and a spacer 24 made of a heat destructible material such as tetrafluoroethylene resin etc. and interposed between the retainer gland 21 and the ball seat retainer 15. The retainer gland 21 presses the ball seat retainer 15 through the spacer 24 toward the ball 14 side under normal conditions of the ball valve and, in case of emergency, presses not only the ball seat retainer 15 but also the second sealing ring 20 toward the ball 14 side because the spacer 24 is burnt down or fused.

Figure 7:
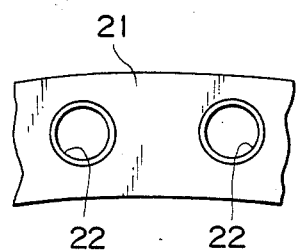
FIG. 7 is a right side view of the retainer gland of FIG. 6 with the spring omitted.

The spring retaining portions 22 of the retainer gland 21 are formed by, for example, forming holes in one surface of the retainer gland 21 at regular intervals in the circumferential direction of the retainer gland 21 as shown in FIG. 7. In this case, each of the holes acting as the spring retaining portions 22 has its inside diameter at the bottom portion thereof reduced, as shown in FIG. 6, to thereby prevent the coiled spring 23 from coming out.

The first embodiment of the present invention has a construction as described above.

Figure 4A:
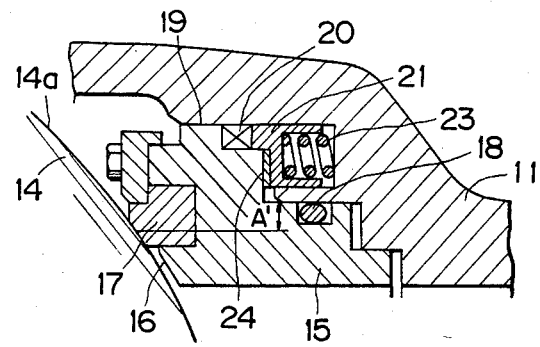
FIG. 4(A) is a cross-sectional view of part of the ball valve with an emergency sealing device of FIG. 3.
Figure 4B:
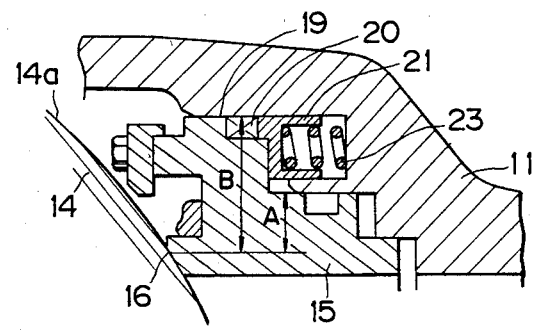
FIG. 4(B) is the same cross-sectional view as in FIG. 4(A), showing the state assumed in case of emergency.
Figure 5A:
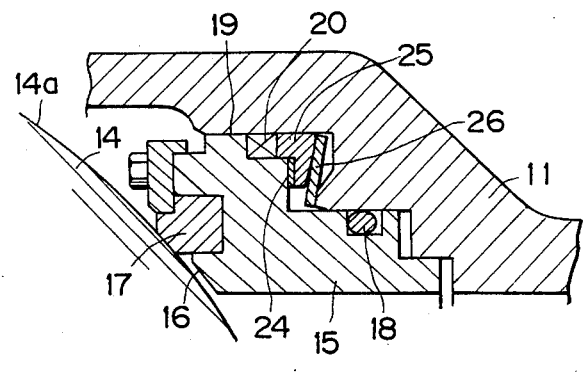
FIG. 5(A) is a cross-sectional view illustrating part of another embodiment of the ball valve with an emergency sealing device according to the present invention.
Figure 5B:
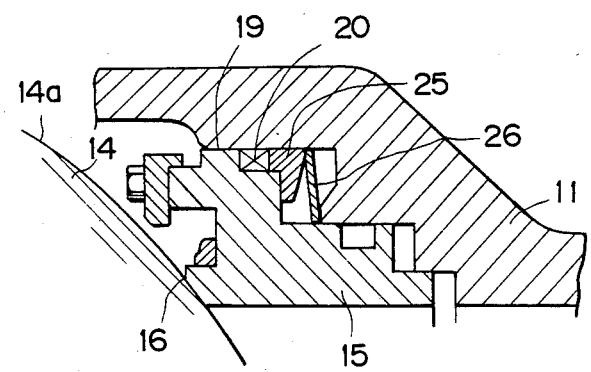
FIG. 5(B) is the same cross-sectional view as in FIG. 5(A), showing the state assumed in case of emergency.

FIGS. 5(A) and 5(B) illustrate another embodiment of the ball valve with an emergency sealing device according to the present invention. The same elements as those in the first embodiment are indicated by the same reference numerals as used in FIGs. 3, 4(A) and 4(B), and description thereof is omitted in the following.

The pressing mechanisms used in this embodiment differ in construction from those in the previous embodiment. To be specific, a belleville spring 26 is used in place of the coiled spring 23 and, therefore, a retainer gland 25 in this embodiment is not required to have a spring retaining portion 22 such as in the first embodiment. The belleville spring 26 is adapted to bias the ball seat retainer 15 toward the ball 14 through the retainer gland 25 and the spacer 24 under normal conditions of the ball valve and, in case of emergency, forcibly press the retainer gland 25 against the second sealing ring 20 to allow the second sealing ring 20 to be deformed and to completely seal off the space between the outer circumference of the ball seat retainer 15 and the inner circumference of the valve body 11. It has been confirmed that this embodiment brings about great sealing performance.

Now, the function of the aforementioned embodiments of the present invention will be described.

Figure 3:
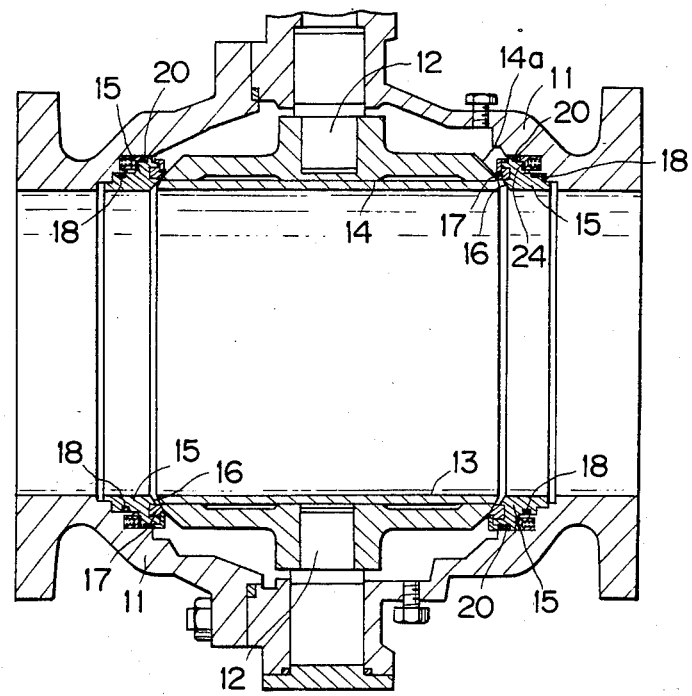
FIG. 3 is a longitudinal cross section showing one embodiment of the ball valve with an emergency sealing device according to the present invention.

Assemblage of the ball valve with an emergency sealing device according to the present invention is accomplished by attaching the coiled springs 23 one each to the spring retaining portions 22 of the retainer glands 21, then attaching the retainer glands 21 to the stepped portions formed on the inside of the valve body 11 (or the body cap) and simultaneously attaching the ball seat retainers 15 each having the ball seat 17, the first sealing rings 18 and the second sealing rings 20 mounted thereon to the retainer glands 21 through the spacers 24, and incorporating the bail 14 and other members, to obtain the construction as illustrated in FIG. 3.

In the normal conditions of the ball valve, as shown in FIG. 3, the ball seat retainers 15 are urged toward the ball 14 by either the force of the coiled springs 23 or the fluid pressure exerted on the ball seat retainers 15, or both, to thereby bring the ball seats 17 into sealing contact with the ball surface 14a, and the portions of contact between the outer circumferences of the ball seat retainers and the inner circumference of the valve body 11 are sealed off by the first sealing rings 18.

When the ball valve which is in the state described above has its interior subjected to high temperatures due to occurrence of a fire etc., since the ball seats 17, O rings 18 and spacers 24 are made of a heat destructible material, they are burnt down or fused. As a result, the coiled springs 23 (belleville springs 26 in the second embodiment) push the seat retainers 15 toward the ball 14 through the retainer glands 21 (25 in the second embodiment) to thereby bring the metal-contact portions 16 of the ball seat retainers 15 into intimate contact with the ball surface 14a. On the other hand, since the retainer glands 21 (25 in the second embodiment) powerfully press the second sealing rings 20, the second sealing rings 20 completely seal off the portions of contact between the outer circumferences of the ball seat retainers 15 and the inner circumference of the valve body 11. In cooperation of the pressing force of the coiled springs 23 (belleville springs 26 in the second embodiment), the fluid pressure is exerted on the ball seat retainer 15 on the primary side, thereby pressing the ball seat retainer 15 toward the ball 14. Since the diameter of the sealing ring 20 functioning in case of emergency is larger than that of the O ring 18 (the first sealing ring) and consequently since the area of the annular portion of the seat retainer 15 on which the difference between the fluid pressures applied to the front and rear surfaces of the ball seat retainer is exerted is made large, the fluid pressure on the primary side presses the side of the ball seat retainer 15 opposite the ball 14 side over a wide range. Therefore, the piston action of the ball seat retainer 15 in the direction of the ball side is considerably increased to thereby complete the function of metal-to-metal sealing between the ball seat retainer 15 and the bail 14 in case of emergency.

Figure 1:
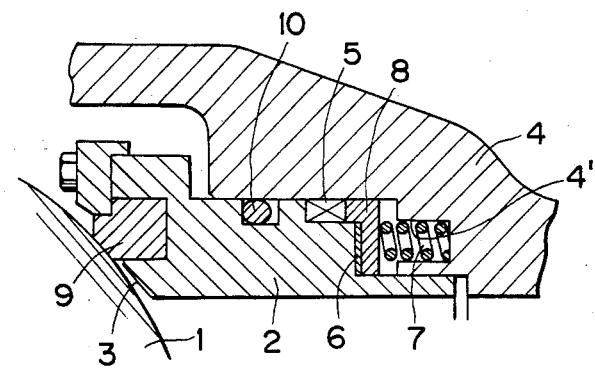
FIG. 1 is a cross-sectional view of part of a conventional ball valve with an emergency sealing device.
Figure 2A:
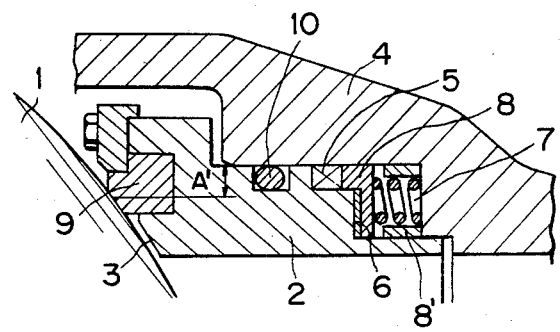
FIG. 2(A) is a cross-sectional view of part of another convetional ball valve with an emergency sealing device.
Figure 2B:
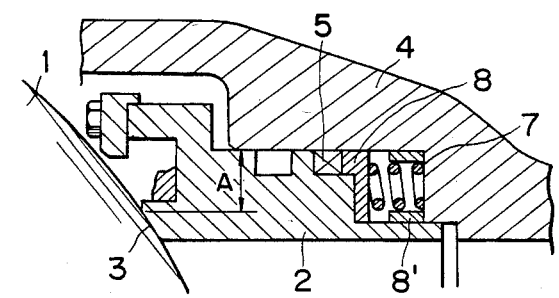
FIG. 2(B) is the same cross-sectional view as in FIG. 2(A), showing the state assumed in case of emergency.

In comparison with the conventional ball valve shown in FIG. 1 or 2(A) in which since the diameter of the O ring 10 (the first sealing ring) is the same as that of the sealing ring 5 (the second sealing ring) the annular portion of the ball seat retainer 2 on which the difference between the fluid pressures applied to the front and rear surfaces of the ball seat retainer is exerted when the seal members are burnt down or fused due to a fire etc. has the thickness A as shown in FIG. 2(B), the corresponding annular portion of the present ball valve has a thickness B, as shown in FIG. 4(B). Since the thickness B is much larger than the thickness A, the ball seat retainer 15 of the present ball valve can make its piston action large enough to bring the metal-contact portion 16 of the ball seat retainer 15 into complete sealing contact with the ball surface 14a.

As is clear from the description given so far, in the ball valve with an emergency sealing device of the present invention, since the annular projection surface is formed on part of the outer circumference of each ball seat retainer and since the heat resistant flexible sealing ring functioning in case of emergency is disposed on the portion of contact between the annular projection portion and the inner circumference of the valve body through the pressing mechanism to make the diameter of the aforementioned second sealing ring larger than that of the first heat destructible sealing ring, the area of the annular portion of the ball seat retainer on which the difference of the fluid pressures applied to the front and rear surfaces of the ball seat retainer is exerted becomes larger than that of the conventional ball valve. For this reason, the piston action of the ball seat retainer can be fully operative at high temperatures due to a fire etc. and the metal-to-metal sealing between the ball seat retainer and the ball can be obtained with accuracy, thereby bringing about excellant results with the ball valve in case of emergency.

Further, in the first embodiment of the present invention, since the spring retaining portion is formed integrally with the retainer gland, the retainer gland can function to retain the coiled spring and can also serve to press the second heat resistant fklexible sealing ring in case of emergency. Therefore, the present invention is advantageous in that an increase in number of the component parts can be prevented to solve an economical problem, and it is not required to bore holes in the valve body to thereby simplify the manufacturing process and the assembling work.

Furthermore, the second heat resistant flexible sealing ring is disposed on the portion of contact between the annular projection portion of the ball seat retainer and the inner circumference of the valve body on the ball side, whereas the first heat destructible sealing ring is disposed on the portion of contact between the outer circumference of the ball seat retainer and the inner circumference of the valve body on the side opposite the ball side. Since the first sealing ring can completely seal off the portion which is to be sealed under normal conditions of the ball valve, there is no fear of the second sealing ring and the pressing mechanism being affected by the fluid itself and the fluid pressure and, thus, the second sealing ring will have a long service life. The second sealing ring is retained under normal conditions of the ball valve without being damaged and, in case of emergency, can promptly fulfill its sealing function with accuracy. Thus, the ball valve with an emergency sealing device of the present invention is of great practical value.

What is claimed is:

1. A ball valve with an emergency sealing device, which comprises a ball provided with a through hole at the center thereof and rotatably disposed within a valve body, ball seat retainers interposed between said valve body and said ball and each provided on part of the outer circumference thereof integrally with an annular projection surface, ball seats made of a heat destructible elastic material, attached one each to said ball seat retainers and adapted to be brought into sealing contact with the surface of said ball, said ball seat retainers each having a metal-contact portion to be brought into sealing contact with the surface of said ball only in case of emergency and said metal-contact portion having a diameter smaller than that of said ball seats, and the outer circumference of said annular projection surface being radially outwardly of said ball seat, first sealing rings made of a heat destructible elastic material and attached to portions of the outer circumferences of said ball seat retainers where they contact the inner circumference of said valve body for carrying out a sealing function under normal conditions, second sealing rings made of a heat resistant flexible material and attached to portions of the annular projection surfaces of said ball seat retainers where they oppose the inner circumference of said valve body for carrying out a sealing function only in case of emergency, and pressing mechanisms disposed between the inner surface of said valve body and the outer surfaces of said ball seat retainers and adapted to urge said ball seat retainers toward the ball under normal conditions and, in case of emergency, to press said ball seat retainers and compress said second sealing rings toward said ball, said second sealing rings having a diameter larger than that of said first sealing rings.

2. A ball valve with an emergency sealing device according to claim 1, wherein said pressing mechanisms each comprises an annular retainer gland which has a number of spring retaining portions formed integrally therewith on the side opposite the ball side, a number of coiled springs each having its one end brought into contact with the inner surface of said valve body and its other end brought into contact with said spring retaining portion of said annular retainer gland, and a spacer made of a heat destructible material and interposed between said annular retainer gland and said ball seat retainer, whereby said annular retainer gland presses said ball seat retainer, through said spacer, toward the ball under normal conditions and, in case of emergency, presses said ball seat retainer and compresses said second sealing ring toward said ball.

3. A ball valve with an emergency sealing device according to claim 1, wherein said pressing mechanisms each comprises an annular retainer gland, a belleville spring having its one surface in contact with said annular retainer gland and its other surface in contact with the inner surface of said valve body, and a spacer made of a heat destructible material and interposed between said annular retainer gland and said ball seat retainer, whereby said annular retainer gland presses said ball seat retainer, through said spacer, toward the ball under normal conditions and, in case of emergency, presses said ball seat retainer and compresses said sealing ring toward said ball.

4. A ball valve with an emergency sealing device according to claim 1, wherein said ball seats are made of a plastic material.

5. A ball valve with an emergency sealing device according to claim 1, wherein said first sealing rings are made of rubber.

6. A ball valve with an emergency sealing device according to claim 1, wherein said second sealing rings are made of flexible graphite.

7. A ball valve with an emergency sealing device according to claim 1, wherein said ball seats are made of plastic material said first sealing rings are made of rubber, and said second sealing rings are made of flexible graphite.

8. A ball valve with an emergency sealing device according to claim 2, wherein said spacer is made of a hard plastic material.

9. A ball valve with an emergency sealing device according to claim 3, wherein said spacer is made of a hard plastic material.

* * * * *